(12) United States Patent
Hegarty et al.

(10) Patent No.: US 9,504,086 B2
(45) Date of Patent: Nov. 22, 2016

(54) SERVICE DOMAIN SELECTION SERVICE INDICATOR

(75) Inventors: Cormac Hegarty, Bromma (SE); Andreas Anulf, Lidingö (SE); Jonas Falkenå, Huddinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 182 days.

(21) Appl. No.: 14/364,259

(22) PCT Filed: Dec. 15, 2011

(86) PCT No.: PCT/EP2011/072957
§ 371 (c)(1),
(2), (4) Date: Oct. 21, 2014

(87) PCT Pub. No.: WO2013/087114
PCT Pub. Date: Jun. 20, 2013

(65) Prior Publication Data
US 2015/0043453 A1     Feb. 12, 2015

(51) Int. Cl.
*H04W 76/06* (2009.01)
*H04L 29/06* (2006.01)
*H04L 12/741* (2013.01)

(52) U.S. Cl.
CPC .............. *H04W 76/06* (2013.01); *H04L 45/74* (2013.01); *H04L 65/1006* (2013.01); *H04L 65/1016* (2013.01); *H04L 65/1036* (2013.01); *H04L 65/1043* (2013.01); *H04L 65/608* (2013.01)

(58) Field of Classification Search
None
See application file for complete search history.

(56) References Cited

U.S. PATENT DOCUMENTS 7,668,159 B2 *  2/2010  Buckley ............ H04L 29/06027
370/352

(Continued)

FOREIGN PATENT DOCUMENTS

CN        101018400 A     8/2007
WO        02091678 A1     11/2002

OTHER PUBLICATIONS

Poikselkä, Miikka et al., "The IMS: IP Multimedia Concepts and Services", John Wiley & Sons Ltd, The Atrium, Southern Gate, Chichester, West Sussex, PO19 8SQ, United Kingdom, 2009, pp. 230-231 and 389-415.

(Continued)

*Primary Examiner* — Anh Ngoc Nguyen
(74) *Attorney, Agent, or Firm* — Murphy, Bilak & Homiller, PLLC

(57) ABSTRACT

A service indication mechanism is described for use by IP Multimedia Subsystem, IMS, codes (201, 204) of an IMS network (106) in routing a terminating call in a network comprising a circuit switched, CS, network (107) and an IMS network (105, 106). On receipt of a Service Initiation Protocol, SIP, message from a second IMS node (202), the SIP message including a called user number associated with the call (A1), a SIP Uniform Resource Identifier, URI, and the call services for the called user from a user profile database is retrieved (A2). A second SIP URI is generated by including a service indicator of the called user in the received SIP URI, the service indicator representing the call services of the called user (A3), the SIP message is transmitted with the second SIP-URI to a third IMS node (204). On receiving the transmitted SIP message, the third IMS node (204) detects whether the service indicator is included in the SIP URI, and applies the service indicator to a plurality of policy rules for indicating whether the terminating call should be routed to the CS network (107) and whether to suppress insertion of a prefix to a CS routing number of the called user. The third IMS node (204) transmits to a CS node (206) a SIP message including the CS routing number without the prefix when a routing policy rule associated with the service indicator indicates suppression of the prefix (B5).

16 Claims, 5 Drawing Sheets

(56) References Cited

U.S. PATENT DOCUMENTS

| | | | |
|---|---|---|---|
| 8,089,956 B2* | 1/2012 | Gu | H04L 12/6418 370/354 |
| 2007/0071221 A1 | 3/2007 | Allen et al. | |
| 2009/0257418 A1 | 10/2009 | Allen et al. | |
| 2010/0034168 A1* | 2/2010 | Mahdi | H04W 36/14 370/331 |
| 2011/0103373 A1 | 5/2011 | Shatsky et al. | |

OTHER PUBLICATIONS

Noldus, Rogier et al., "Multi-Access for the IMS Network", Ericsson Review No. 2, Available online at: http://www.ericsson.com/ericsson/corpinfo/publications/review/2008_02/files/7_IMA.pdf, 2008, pp. 81-86.

Rosenberg, J. et al., "Caller Preferences for the Session Initiation Protocol (SIP)", IETF Network Working Group, Request for Comments: 3841, Category: Standards Track, Aug. 2004, pp. 1-52.

* cited by examiner

SERVICE DOMAIN SELECTION SERVICE INDICATOR

TECHNICAL FIELD

The present invention relates to methods and apparatus for routing a terminating call based on the call services of the called user. More particularly, the invention relates to methods and apparatus for routing the terminating call from the IP Multimedia Subsystem (IMS) to the Circuit Switched (CS) network when the called user has CS voice services and IMS services.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IP Multimedia Subsystem (IMS) network (also referred to as IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Other protocols are used for media transmission and control, such as Real-time Transport Protocol and Real-time Transport Control Protocol (RTP/RTCP).

IMS will ease the migration from existing CS and packet-switched (PS) based access networks to all IP access networks. Based on the 3GPP standards, the IMS will serve the user as a single service engine for future PS networks. These standards also describe IMS Centralized Services (ICS) where a user's services are migrated from a CS access network to an IMS based network such as an all IP network, for example, the so-called Long Term Evolution (LTE) and LTE-Advanced systems. This means that the IMS will have to handle all originating and terminating calls.

A user equipment (UE) may comprise or represent any device used for communications. Examples of user equipment that may be used in certain embodiments of the described access networks are wireless devices such as mobile phones, terminals, smart phones, portable computing devices such as lap tops, handheld devices, tablets, netbooks, computers, personal digital assistants and other wireless communication devices.

FIG. 1 illustrates schematically a communication network architecture 100 including a user equipment (UE-A) 101 in an originating network 102 and a user equipment (UE-B) 103 in a terminating network 104. When a calling party such as user A of UE-A 101 places a call to a called party such as user B of UE-B 103, the call set-up process involves an originating call associated with UE-A 101 set up in the originating network 102 and a terminating call associated with UE-B 103 set up in the terminating network 104.

The terms "originating call" and "terminating call" may comprise or represent the connection set-up signalling in relation to UE-A 101 and UE-B 103, respectively. Examples of originating or terminating calls that may be used in certain embodiments of the described network, include but are not limited to, the connection set-up signalling enabling a communication connection to be made between user A of UE-A 101 and user B of UE-B 103 in the two call halves model. The originating call is the connection set-up signalling for user A of UE-A 101 in relation to the originating network 102 in the first call half and the terminating call is the connection set-up signalling for connecting the call with user B of UE-B 103 in relation to terminating network 104 in the second call half.

The originating network 102 may include an IMS network 105, and other core and access networks such as a CS core network, PS access network, and/or a CS access network (not shown). The terminating network 104 includes an IMS core network 106, a CS core network 107, a PS access network such as LTE/LTE Advanced access network 108, a CS access network such as Wideband Code Division Multiple Access (WCDMA) access network 109, and a CS access network such as Global System for Mobile Communications (GSM) access network 110.

In this example, it is assumed that UE-A 101 is subscribed to IMS services, which include IMS voice services, messaging and video etc. When UE-A 101 places a call to UE-B 103, UE-A 101 will be the calling party and the call signalling of the first call half is the originating call in relation to UE-A 101. This will be directed to the IMS network 105 in the originating network. As UE-B 103 is located in the terminating network 104, IMS network 105 informs IMS network 106 of the terminating network 104 to proceed to set up the call signalling for the called party, which is UE-B 103, and the call signalling of the second call half, i.e. the terminating call in relation to UE-B 103. Depending on the subscription user B of UE-B 103 may have, the terminating call may be directed to/from the IMS network 106 to the CS core network 107 or to PS access networks 108 and/or 109 for connecting UE-A 101 with UE-B 103.

The IMS networks 105 and 106 may include nodes for performing a service domain selection (SDS) function, which is the selection of the service network or domain in which call services shall be executed. The choice is for call services to be executed in either the CS core network (CS domain) or the IMS. In addition, CS core network 107 also has T-SDS function for also selecting the service domain. Following SDS, if the IMS network 106 is selected, then a terminating access domain selection (T-ADS) function may be performed for selecting the access network. If the CS core network 107 is selected, then a network access selection function (e.g. a Select Access function) may be performed for selecting the access network. For example, a CS access network such as GSM access network 110 or WCDMA access network 109 and/or one or more PS access network(s) such as LTE access network 108 may be selected for delivering a terminating session or call to UE-B 103 such that a call is set up between UE-A 101 and UE-B 103.

In the case that an incoming terminating call is received through a CS core network (or domain) 107 for a user or subscriber having an IMS service, the CS core network 107 is typically required, as part of its T-SDS function, to route the incoming call to the IMS network 106. This may be implemented, for example, using Customized Applications for Mobile network Enhanced Logic (CAMEL) for call diversion to the IMS network 106, e.g. from CS network 107 to IMS network 106. As an example, upon receipt of an incoming terminating call, the gateway mobile switching center (GMSC) node (not shown) of CS network 107 may query a home subscriber server (HSS) (not shown) for routing information via a Send Routing Information (SRI) query. The user profile in the HSS is configured to return a terminating-CAMEL service indicator (T-CSI) including a Global System for Mobile communications-Service Control Function (gsmSCF) address to the GMSC node in response to the SRI query. When handling calls for a subscriber with a service provided by the IMS network, the processing at the gsmSCF (not shown) and the GMSC node results in routing of the terminating call to the IMS network using an IMS routing number (IMRN) returned from the gsmSCF.

When T-SDS is performed in the IMS network to determine the service engine for a user, the IMS network is required to receive terminating voice calls, even when a CS core network may be used as a telephony service engine for at least a sub-set of the subscribers. This may mean that a terminating call routed out from the IMS network to the CS network may be routed back to the IMS network due to the aforementioned T-SDS mechanism is used by the GMSC node. When T-CSI is retrieved by the GMSC node, then the terminating call (in which a subscriber may have CS telephony services and some IMS services) will be routed back to IMS causing a circular loop. This is because the HSS detects the subscriber is subscribed to IMS services such that the T-CSI causes the GMSC node and gsmSCF to route the terminating call to the IMS network.

As an example, in a multi-service offering where a network operator may provide both Voice over LTE (VoLTE) services to a set of users (e.g. user A of UE-A 101) and Rich Communication Suite (RCS)/RCS-email and CS telephony services to another set of users (e.g. user B of UE-B 103). For a VoLTE originating voice call from UE-A 101 to UE-B 103, the IMS network 106 of the terminating network 104 must be able to break out or route the terminating call set-up signaling to the CS core network 107. The reason for this is that when using RCS, the enriched services are handled by the IMS network 106 so that user B will have subscribed to some IMS services, but voice services of user B must be handled by the CS core network 107. Potentially, this can create a circular loop when performing T-SDS for the terminating call, as it may be routed from the IMS network 106 to the CS core network 107 and back again should the calling party be an IMS subscriber for some services, even though they may have CS telephony services.

There is a desire for a mechanism in nodes of the IMS that provide T-SDS functionality to avoid circular loops occurring between IMS and CS networks when performing a T-SDS function.

SUMMARY

It is an object of the present invention to provide a mechanism for routing a terminating call from an IMS network to a CS network to prevent the terminating call being routed back to the IMS network.

According to a first aspect of the invention there is provided a method of routing a terminating call associated with the UE of a called user in a network comprising a circuit switched, CS, network and an IP Multimedia Subsystem, IMS, network. The method is performed by a first IMS node and includes receiving a Session Initiation Protocol (SIP) message from a second IMS node, the SIP message including, in a route header of the SIP message, a SIP Uniform Resource Identifier, URI, associated with the UE of the called user. The method includes detecting whether a service indicator representing the call services of the called user is included in the SIP URI, applying the service indicator to a plurality of policy rules for indicating whether the terminating call should be routed to the CS network and whether to suppress insertion of a prefix to a CS routing number associated with the UE of the called user. Transmitting, based on the indication, to a CS node, a SIP message including the CS routing number without the prefix when a routing policy rule associated with the service indicator indicates suppression of the prefix.

As an option, the method includes transmitting to the CS node a SIP message including the CS routing number and the prefix when a routing policy rule associated with the service indicator indicates transmission of the prefix or when it is determined that the SIP URI does not include a service indicator. Optionally, applying the service indicator to a plurality of policy rules further includes determining whether the service indicator is associated with a routing policy rule indicating that the call should be routed to the CS network and that a Customized Applications for Mobile Network Enhanced Logic Subscription Information, CSI, trigger associated with the terminating call is to be enabled at the CS node, and transmitting the SIP message to the CS node includes the steps of transmitting to the CS node a SIP message including a CS routing number associated with the UE for the called user without the prefix when the routing policy rule associated with the service indicator indicates routing the terminating call to the CS network and enabling the CSI trigger. Transmitting, to the CS node, a SIP message including a CS routing number associated with the UE of the called user and a prefix when the service indicator is not included in the SIP URI and when routing the call to the CS network with suppression of the CSI trigger. The CSI trigger can be a terminating CSI trigger.

As an option, the method may further include determining whether the service indicator is associated with a routing policy rule indicating whether the terminating call should be routed within the IMS network, and transmitting a SIP message to a third node or an application server in the IMS for terminating the call in the IMS.

As an option, the node may include a terminating service domain selection, T-SDS, function arranged for performing the steps of detecting, applying, and/or transmitting when routing the terminating call. Optionally, the received SIP message is received from a second IMS node or an application server that includes the functionality of serving call/session control functions (S-CSCF).

According to a second aspect of the invention there is provided a method of routing a terminating call associated with the UE of a called user in a network comprising a CS network and an IMS network. The method being performed by an IMS node or application server, and including the steps of receiving a Service Initiation Protocol, SIP, message from a second IMS node, the SIP message including a called user number associated with the call. The method includes retrieving a SIP URI and the call services for the called user from a user profile database, generating a second SIP URI by including a service indicator of the called user in the received SIP URI, the service indicator representing the call services of the called user, and transmitting, to a third IMS node, a SIP message including the second SIP URI in a route header of the SIP message for use by the third IMS node in routing the terminating call.

As an option, the method includes retrieving the SIP URI for the called user by performing an initial filter criteria query in relation to the called user. Optionally, the step of transmitting the SIP message to a third IMS node further comprises transmitting the SIP message to the third IMS node having a terminating service domain selection (T-SDS) function for routing the terminating call. Alternatively or additionally, the called user number is a Mobile Subscriber Integrated Services Digital Network Number (MSISDN) associated with the UE of the called user, where the step of transmitting the SIP message to a third IMS node includes sending the MSISDN in the SIP message for use in routing the terminating call. The received SIP message from the second IMS node may be received from the second IMS including interrogating call/session control functions. Alternatively or additionally, the transmitted SIP message is transmitted to the third IMS node including the functionality of a service centralization and continuity application server.

According to a further aspect of the invention there is provided a network node for routing a terminating call associated with a UE of a called user in a network comprising a CS network and an IMS network. The network node includes a receiver, a transmitter, a memory unit, and a processor, the processor being connected to the receiver, to the transmitter, and to the memory unit. The receiver is configured for receiving a SIP message from a second IMS node, the SIP message including, in a route header of the SIP message, a SIP URI associated with the called user. The processor is configured to detect whether a service indicator representing the call services of the called user is included in the SIP URI and apply the service indicator to a plurality of policy rules for indicating whether the terminating call should be routed to the CS network and whether to suppress insertion of a prefix to a CS routing number associated with the UE of the called user. The transmitter is configured for sending to a CS node a SIP message including the CS routing number without the prefix when a routing policy rule associated with the service indicator indicates suppression of the prefix.

As an option, the transmitter is further configured to send to the CS node a SIP message including the CS routing number and the prefix when the processor determines that a routing policy rule associated with the service indicator indicates transmission of the prefix or when it is determined that the SIP URI does not include a service indicator. Optionally, the processor is further configured for determining whether the service indicator is associated with a routing policy rule indicating that the call should be routed to the CS network and that a CSI trigger associated with the call is to be enabled at the CS node. The transmitter is further configured for sending a SIP message to the CS node, the SIP message including a CS routing number associated with the UE of the called user when the processor determines that a routing policy rule associated with the service indicator indicates routing the terminating call to the CS network and enabling the CSI trigger. The transmitter is further configured for sending a SIP message to the CS node, the SIP message including a CS routing number with a prefix for the called user when the service indicator is not included in the SIP URI and when routing the terminating call to the CS network with suppression of the CSI trigger.

In yet another aspect of the invention there is provided a network node for use in routing a terminating call associated with a UE of a called user in a network comprising a CS network and an IMS network. The network node includes a receiver, a transmitter, a memory unit, and processor, the processor being connected to the receiver, to the transmitter, and to the memory unit. The receiver is configured for receiving a SIP message from an IMS node, the SIP message including a called user number associated with the terminating call. The processor is configured to retrieve a SIP URI and the call services for the called user from a user profile database and to generate a second SIP URI by inserting a service indicator of the called user into the received SIP URI, the service indicator representing the call services of the called user. The transmitter is configured to transmit, to a second IMS node, a SIP message including the second SIP URI in a route header of the SIP message for use in routing the terminating call. As an option in the methods and network nodes described, the service indicator forms part of the fully-qualified domain name of the SIP URI.

Optionally, in the methods or network nodes described the service indicator represents call services that include a IMS services and/or CS voice services. The service indicator may represent call services related to messaging/video services in the IMS and/or in the CS networks. The service indicator may represent call services based on a rich communication suite, RCS.

Embodiments of the present invention can provide a relatively simple and efficient mechanism for handling calls for called users or subscribers with subscriptions to CS voice services and IMS services. A particular application of the invention involves those cases where RCS/RCS-e subscribers with CS voice also have IMS subscription. Of course, other CS voice and IMS service combinations may be employed.

DETAILED DESCRIPTION

Figure 1:
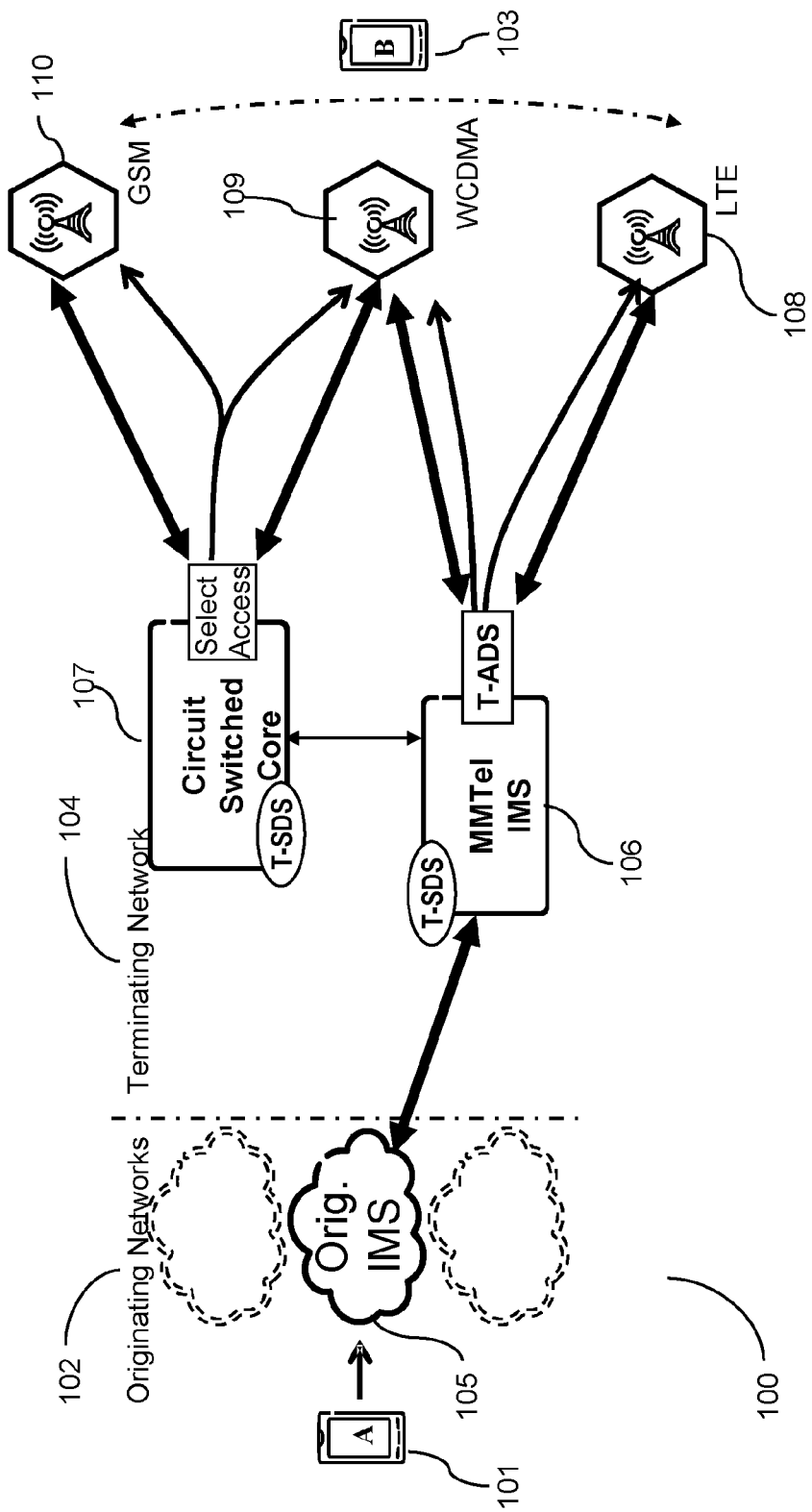
FIG. 1 illustrates schematically a communications network including an originating network and a terminating network.

In order to overcome the problems identified above there will now be described methods and apparatus for routing a terminating call associated with a UE of a called user from an IMS network to a CS network. For simplicity, the same reference numerals used in FIG. 1 will be reused in the following figures identifying the same or similar network elements.

As mentioned above, if a terminating call associated with the UE of a called user is routed out from the IMS network 106 to the GMSC node (not shown) of the CS network 107, then the aforementioned CAMEL mechanism used by the GMSC node means that T-CSI is downloaded and the call will be routed back to the IMS network 106. A circular loop can occur in which the terminating call is routed from the IMS network 106 to the CS network 107 and back.

A solution to alleviate this problem causes the T-SDS function at an IMS node (e.g. at an Service Centralization and Continuity Application Server (SCC-AS) node) to allocate a specific Circuit Switched Routing Number (CSRN), which can be an MSISDN with added prefix digits. The GMSC node and other nodes of the CS network 107 may be configured to recognise that the specific CSRN (with added prefix digits) indicates that the IMS node (e.g. the SCC AS) has already anchored the terminating call in the IMS network 106 and that the terminating call should be terminated in the CS network 107. By detecting the prefix of the specific CSRN, the GMSC node resolves the MSISDN from the specific CSRN and invokes the CS call terminating procedure in which the GMSC node includes the "Suppress T-CSI" parameter in the MAP SRI request sent to the HSS/HLR. This means that T-CSI is not returned in the MAP SRI-Response from the HSS/HLR, therefore the GMSC node will not invoke CAMEL services for this user (e.g. UE-B 103), which, as outlined earlier, may be a user subscribed to IMS service and will result in the gsmSCF returning an IMS routing number (IMRN) to the GMSC node. Absence of the T-CSI in the MAP SRI-Response ensures that the GMSC node will route and terminate the call (based on the information returned such as the MSRN-Mobile Switching Routing Number) in the CS network 107.

In the above-mentioned example in which an operator has a multi-service offering that provides both VoLTE and RCS/RCS-e services, the IMS network 106 must be capable of breaking out a VoLTE originating voice call (e.g. a call from UE-A 101) to a non-VoLTE RCS subscriber (e.g. user B of UE-B 103) to the CS network 107 on the terminating side. The reason for this is that when using RCS, enriched services are handled by the IMS network 106 while voice services can be handled by the CS network 107. Since the T-SDS function in the IMS network 107 will be invoked for IMS subscribers with VoLTE voice services (e.g. IMS network 107 may be used for service engine) it is not enough for the T-SDS function to assume that if the subscriber has an IMS subscription then the service engine is IMS. This is because RCS-e subscribers with CS voice services will also have an IMS subscription. The node in the IMS network 106 providing the T-SDS functionality for the RCS+CS Voice subscribers needs a "detection/Service Indication" mechanism to recognise that the call in question is an RCS voice call that should be delivered to and served by the CS service engine of CS network 107.

As described above, for typical breakouts to the CS network 107, the IMS network 106 may allocate a specific CSRN, which can be an MSISDN with additional prefix digits, which is used by the CS network 107 to prevent the terminating call from being routed from the CS network 107 back to the IMS network 106 thus creating a circular loop. However, in the case of users having some IMS services such as email and video messaging services but with CS voice subscription, (e.g. RCS+CS voice subscription users), this may lead to erroneous operation as the GMSC node in the CS network 107 will, based on the received specific CSRN with prefix, include a "Suppress T-CSI" parameter in the SRI sent to HSS. When this mechanism is used for subscribers having IMS services and CS voice services, then for terminating calls that have the CS network 107 as their service domain, then the GMSC node may instead need to invoke CAMEL services based on a T-CSI indication sent by the GMSC node in a MAP-SRI-Response message. This will allow the subscriber's CS voice service to be executed and the terminating call to be terminated properly in the CS network 107. This means the mechanism should differentiate the break out and routing of the terminating call to the CS network 107 based on the IMS/CS services required (e.g. RCS).

A possible solution for routing a terminating call associated with the UE 103 of a called user is to implement a mechanism for informing a first IMS node performing the T-SDS function of the call services of the called user. The first IMS node may receive a SIP message from a second IMS node, the SIP message including, in a route header of the SIP message, a SIP URI associated with the UE 103 of the called user. The first IMS node then searches the SIP URI to detect whether a service indicator representing the call services of the called user is included in the SIP URI. The service indicator comprises data representative of one or more call services of the called user, such as IMS services or CS services, or a combination of IMS and CS call services. The first IMS node then applies the service indicator to a plurality of policy rules, which may be stored in the first IMS node or accessible from a databases by the first IMS node, for indicating whether the terminating call should be routed to the CS network 107 and whether to suppress insertion of a prefix to a CS routing number associated with the UE 103 of the called user. The first IMS node transmits, based on the indication, towards a CS node, such as the GMSC node, a SIP message including the CS routing number without the prefix when a routing policy rule associated with the service indicator indicates suppression of the prefix.

In order to inform the first IMS node of the call services of the called user, a second IMS node may insert the service indictor into a SIP URI related to the IMS node. In particular, when the second IMS node or application server receives a SIP message from another IMS node (e.g. an Interrogating Call/Session Control Function (I-CSCF) node) that includes a called user number associated with the terminating call, the second IMS node retrieves a SIP URI associated with the called user (the SIP URI informs the second IMS node where to forward the SIP message for routing the terminating call) and the call services for the called user from a user profile database. The second IMS node then generates a second SIP URI by including a service indicator of the called user in the received SIP URI, the service indicator representing the call services of the called user. The second IMS node then transmits the receive SIP message, to the first IMS node, in which the SIP message further includes the second SIP URI in a route header of the SIP message for use by the first IMS node in routing the terminating call.

An example solution is now described for the mechanism that indicates whether a terminating call should be routed to the CS network 107 as its serving domain by suppressing or not suppressing the prefix based on the service required.

Figure 2A:
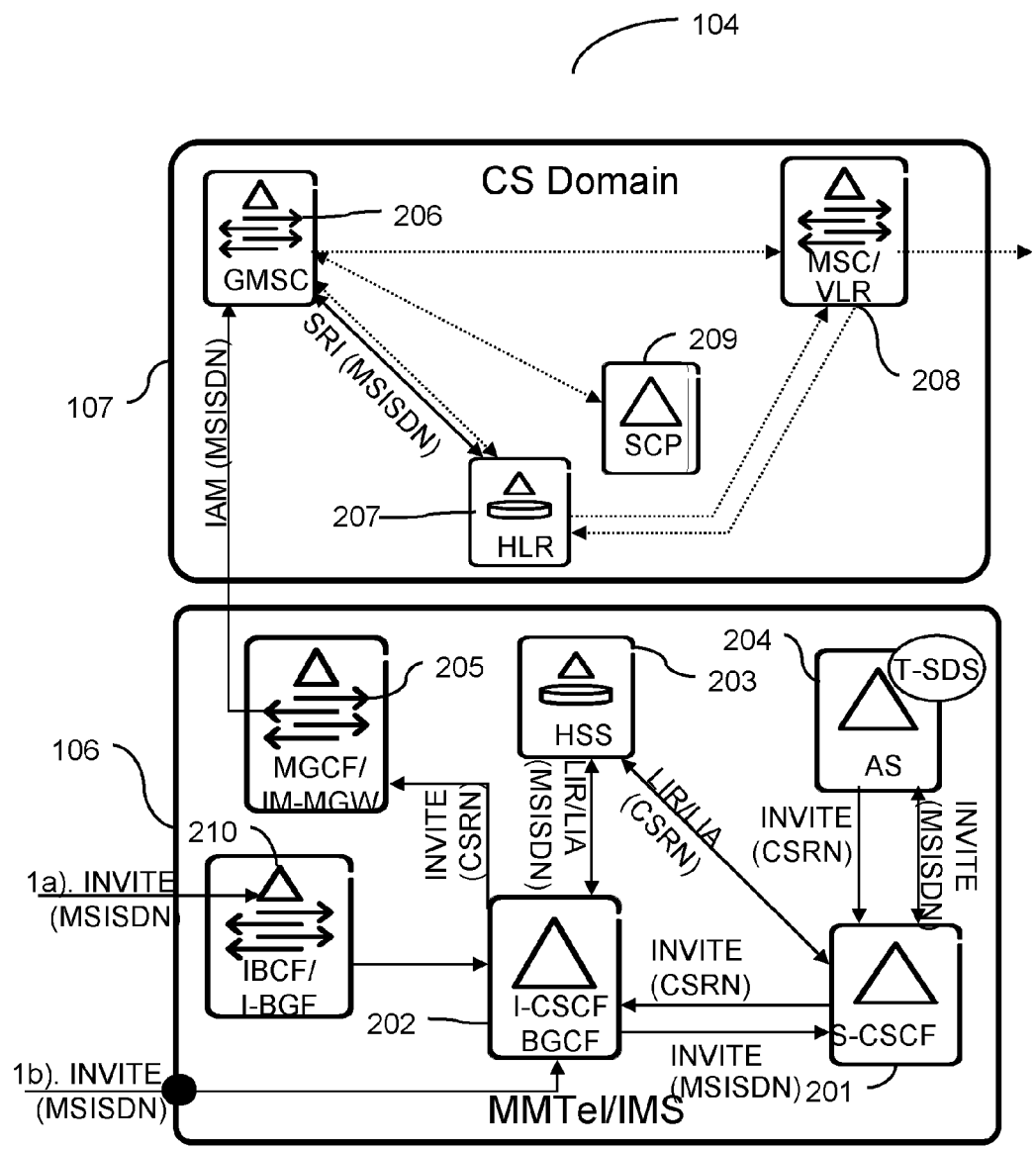
FIG. 2a illustrates schematically a terminating network for use in an example solution for routing a terminating call.
Figure 2B:
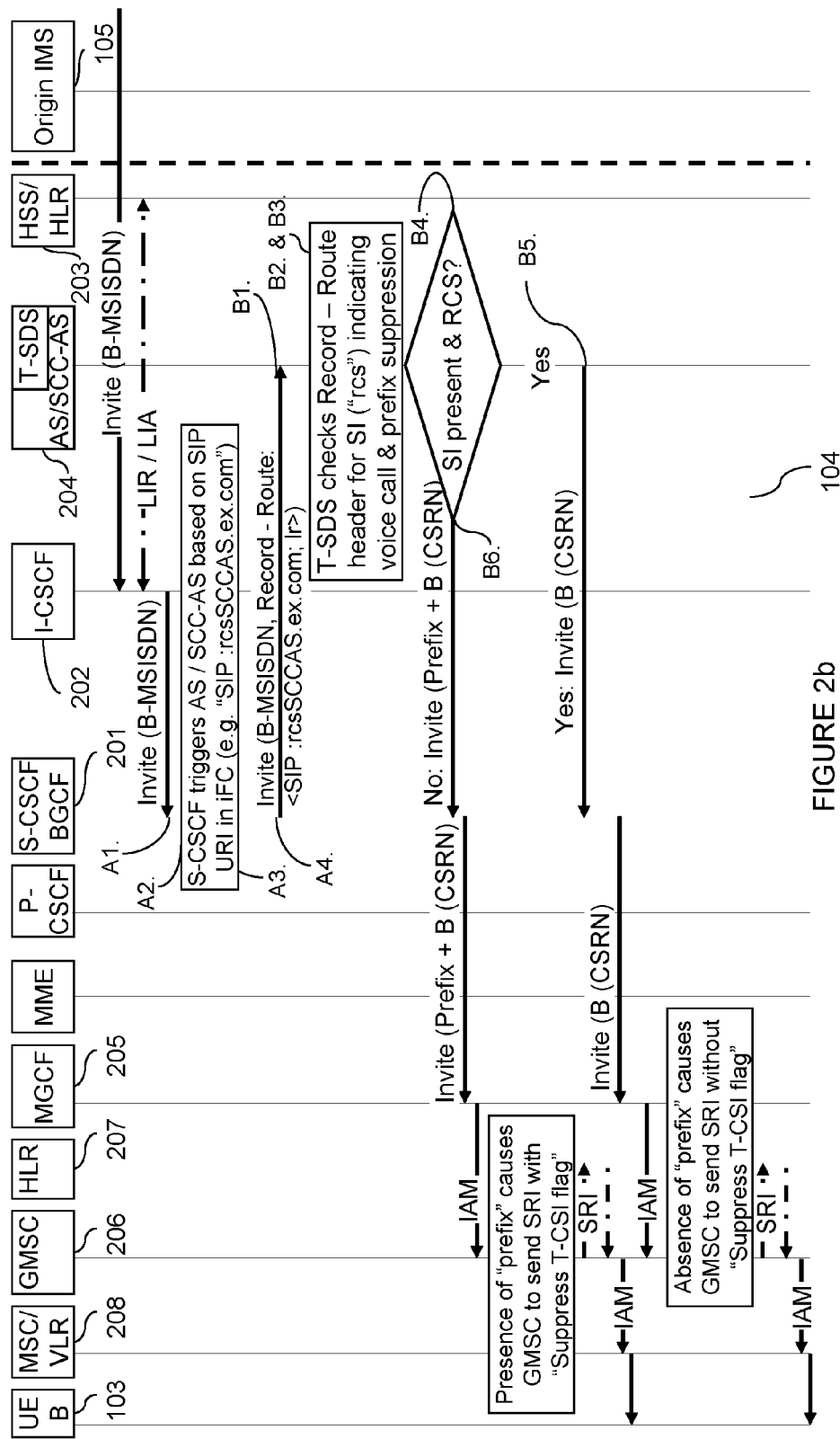
FIG. 2b is a signalling flow diagram illustrating an example solution for routing a terminating call.

FIGS. 2a and 2b illustrate a schematic diagram and a signalling flow diagram for an example of a solution for routing a terminating call associated with the UE of a called user, e.g. UE-B 103, in a terminating network 104. Terminating network 104 includes IMS network 106 and CS network 107. The IMS network 106 includes network entities or nodes that send/receive signals to/from the originating IMS network 105 (and other networks) and CS network 107.

The IMS network nodes include Call/Session Control Function (CSCF) nodes, which operate as SIP proxies within IMS network 107. The 3GPP architecture defines several types of CSCF nodes: the Serving CSCF (S-CSCF) node 201 provides services to the user that the user is subscribed to; the Interrogating CSCF (I-CSCF) node 202 identifies the correct S-CSCF node 201 and forwards to that S-CSCF node 201 SIP requests received from other networks such as originating IMS network 105 or via other IMS nodes such as an Interconnection Border Control Functions (IBCF) 210 for call set-up of a terminating call in relation to UE-B 103. For simplicity, FIG. 2a shows the I-CSCF node 202 including Breakout Gateway Control Function (BGCF) functionality. It is to be appreciated that S-CSCF node 201 may also include BGCF functionality as shown in FIG. 2b.

A multimedia gateway control function (MGCF) node 205 acts as the interface between the CS network 107 and the IMS network 106, the MGCF node 205 performs call control protocol conversion between SIP messages and Integrated Services Digital Network User Part (ISUP)/Bearer Independent Call Control (BICC) messages. The MGCF node 205 translates non-SIP signalling messages (ISUP/BICC) received from the CS network 107 into SIP messages used in the IMS network 107 and vice versa. The Service Centralization and Continuity Application Server (SCC-AS) node 204 is shown in this example to perform T-SDS functions (it may also perform T-ADS functions) in relation to terminating calls. In this example, SCC-AS node 204 performs T-SDS functions.

The CS network 107 connects to the IMS network 106 via MGCF node 205 and Gateway MSC node 206. The GMSC node 206 acts as an interface between a CS access network such as a GSM or WCDMA backbone network in which UE-B 103 is based (not shown) and the IMS network 107. In the CS network 107, the GMSC node 206 is also connected to a home location register (HLR) node 207, a Service Control Point (SCP) node 209, and Mobile Switching Center (MSC)/Visitor Location Register (VLR) node 208 for use, amongst other things, in performing CS terminating call procedures.

Referring to FIGS. 2a and 2b, when user A of UE-A (not shown) originates a call to UE-B 103 in the originating network 102, as UE-A is an IMS subscriber to VoLTE services, IMS network 105 (not shown) proceeds to direct the terminating network 104 to perform call set-up signalling for UE-B 103. It is assumed, by way of example only, that user B of UE-B 103 is an RCS subscriber and has CS voice telephony services. In the terminating network 104, the I-CSCF node 202 of IMS network 106 receives (from the IMS network 105 of the originating network 102 a terminating voice call for UE-B 103 in the form of a SIP Invite message including an MSISDN for UE-B 103 of user B. As shown in FIG. 2a, the terminating call may be received via an Multimedia Telephony (MMTeI) Network-to-Network Interface (NNI) (e.g. signal 1a) or from an own MMTeI subscriber or User-to-Network Interface (UNI) (e.g. signal 1b). In any event, on receiving the SIP Invite message, the I-CSCF node 202 performs a location information request (LIR)/location information answer (LIA) query using the MSISDN of UE-B 103 with the home subscriber server (HSS) 203 to retrieve an address of the S-CSCF node 201 for use in performing call set-up of the terminating call in relation to UE-B 103. Since user B is an RCS subscriber, an IMS subscription exists and, assuming the RCS client is registered, then an S-CSCF node 201 is allocated to UE-B 103. If the RCS client is not registered, terminating unregistered service is triggered. The I-CSCF node 202 proxies the terminating call to the S-CSCF node 201 by sending a SIP request message including the MSISDN of UE-B 103 (e.g. Invite (B-MSISDN)).

In the example solution for routing a terminating call, the S-CSCF node 201 performs steps A1 to A4 illustrated in FIG. 2b. In step A1, the S-CSCF node 201 receives the SIP request message including the called number associated with UE-B (e.g. SIP Invite (B-MSISDN)). In step A2, the S-SCSF node 201 retrieves the SIP URI of the IMS T-SDS application server or node, which in this example is SCC-AS node 204, and the call services for UE-B 103 from a user profile database using an Initial Filter Criteria (iFC) query to retrieve filter criteria stored in the HSS 203 as part of the IMS subscription profile of the called user. This includes the SIP URI associated with the IMS T-SDS application server or node. The SIP URI is used to indicate to the S-CSCF node 201 that T-SDS should be invoked for the terminating call session for UE-B 103. The SIP URI may be a full qualifying domain name (FQDN), as an example, the SIP URI retrieved may be of the form (sip:SDSapplication1.example.com) or (sip:SCCAS.ex.com). This indicates to the S-CSCF node 201 the IMS T-SDS node for routing/forwarding the SIP Invite (B-MSISDN) for routing the terminating call.

In step A3, the S-CSCF node 201 generates a new SIP URI including the SIP-URI of the T-SDS application server with a service indicator of UE-B 103. The service indicator represents the call services of UE-B 103. The service indicator is included into the SIP URI, for example, the new SIP URI may take the form <service indicator+old SIP URI>—the "+" is used to indicate inclusion of the service indicator into the old SIP URI. When the SIP URI is an FQDN, then the new SIP URI may be <service indicator+FQDN>. In this example, as UE-B 103 is an RCS subscriber the service indicator may take the form of a text string such as "rcs", which may be included into the SIP URI of the IMS T-SDS node. For example, the new SIP URI may be <"rcs"+old SIP URI>. As an example, if the old SIP URI is (sip:SDSapplication1.example.com) then the new SIP URI may take the form (sip: rcsSDSapplication1.example.com). As another example, as in FIG. 2b, if the old SIP URI is (sip:SCCAS.ex.com) then the new SIP URI may take the form (sip:rcsSCCAS.ex.com).

It is to be appreciated that the service indicator could be inserted anywhere within the old SIP URI. However, from an "ease of routing" perspective, it can be inserted at the beginning of the FQDN of the old SIP URI. This is because it is easier to configure Domain Name Servers and will also be easier for the IMS T-SDS node (or SCC-AS node 204) to parse the new SIP URI or FQDN when detecting/searching for the service indicator.

In step A4, the S-CSCF node 201 transmits or forwards a SIP request message to the SCC-AS node 204 (in FIG. 2a this is the IMS T-SDS application server or node) with the new SIP URI in the route header for use by the SCC-AS node 204 in routing the terminating call. In FIG. 2a, the SIP request message that is transmitted by S-CSCF node 201 may takes the form, Invite (B-MSISDN, Record-Route: <sip: rcsSCCAS.ex.com; Ir>).

On receiving a SIP Invite message from the S-CSCF node 201, in the example solution for routing a terminating call, the SCC-AS node 204 performs steps B1 to B6 illustrated in FIG. 2b. It is assumed that the SCC-AS node 204 has access to a plurality of policy rules that define the various service indicators that may be received within a SIP URI and actions that should be performed for each service indicator detected. In step B1, the SCC-AS node 204 receives, from the S-CSCF node 201, the SIP request message with a route header including a SIP URI in relation to the called user UE-B 103, (e.g. Invite (B-MSISDN, Record-Route: <sip: rcsSCCAS.ex.com; Ir>)).

In step B2, the SCC-AS node 204, or a node or application server having T-SDS functionality, parses the received SIP URI in the route header (e.g. rcsSCCAS.ex.com) and detects a service indicator representing the call services of UE-B 103. In this example, the SCC-AS node 204 detects "rcs" within new SIP URI, sip: rcsSCCAS.ex.com. This indicates that UE-B 103 is an RCS subscriber with CS voice services. In step B3, the SCC-AS node 204 applies the detected service indicator (e.g. "rcs") to determine the correct policy rule to use from the plurality of policy rules. In step B4, the SCC-AS node 204 determines whether the policy rule in relation to the service indicator (e.g. "rcs") indicates that the terminating call should be routed to the CS network 107, and whether suppression of the prefix of the CSRN is required. In the case of an RCS subscriber having CS voice services, as UE-B 103 is, then the policy rule associated with the service indicator will indicate the terminating call should be routed to the CS network 107, and that suppression of the prefix of the CSRN is required. This means step B5 will be performed where the SCC-AS node 204 re-routes the terminating call to the CS network 107 by transmitting or forwarding to the CS network 107 a SIP Invite request message with the CSRN for UE-B 103 with the prefix suppressed, i.e. no prefix is included in the CSRN.

In this example, since the service indicator is "rcs", then in step B5 the SCC-AS node 204 re-routes the call using a CSRN for user B of UE-B 103 and, as it was determined from the policy rule for "rcs" that user B of UE-B 103 is an RCS user, no prefix is added to the CSRN. This ensures that T-CSI in the CS network 107 is not suppressed, i.e. T-CSI will be invoked. The SIP request message forwarded by the SCC-AS node 204 to the S-CSCF node 201 takes on the form Invite(B(CSRN)).

The SIP request message (e.g. Invite(B(CSRN))) is received by the S-CSCF node 201, the S-CSCF node 201 in its response queries HSS/HLR 203 using the CSRN to determine whether the UE-B is currently served/attached to the IMS network 106 (or IMS domain). However, as user B of UE-B 103 is currently attached to the CS network 107, the CSRN is not found in the HSS/HLR 203 and the HSS 203 informs the S-CSCF node 201 accordingly. In response, the S-CSCF node 201 performs breakout via the BGCF function (which may be part of the S-CSCF 201 in FIG. 2b or part of the I-CSCF node 202 in FIG. 2a, or any other part of IMS network 106), which routes the terminating call (e.g. Invite (B(CSRN))) via MGCF node 205 to GMSC node 206 of CS network 107. The MGCF node 205 translates the SIP Invite (B (CSRN)) to the appropriate ISUP messaging and is configured to route the terminating call to GMSC node 206 of CS network 107 using the B(CSRN) (e.g. an Initial Address Message (IAM) including information representing the B(CSRN) is sent to GMSC node 206). At the GMSC node 206, the absence of a "prefix" causes GMSC node 206 to send an SRI query without the "Suppress T-CSI" parameter such that normal CS handling and normal CS terminating procedures are invoked allowing the CS network 107 to connect the terminating call with UE-B 103 in an appropriate access network e.g. a GSM or WCDMA access network 110 or 109 (not shown).

When the policy rule associated with the service indicator indicates the terminating call should be routed to the CS network 107 but that a prefix should be included in the CSRN, then in step B6 the SCC-AS node 204 re-routes the terminating call to the CS network 107 by transmitting or forwarding to the CS network 107 a SIP request message with a specific CSRN for UE-B 103 that includes a prefix. For example, the specific CSRN for UE-B 103 may include a prefix and the MSISDN for UE-B 103.

In this example, the SIP request message (e.g. Invite (Prefix+B(CSRN))) is received by the S-CSCF node 201, the S-CSCF node 201 in response performs breakout via the BGCF function (which may be part of the S-CSCF node 201 or part of the I-CSCF node 202, or any other part of the IMS network 106), such that the terminating call is routed to the CS network 107 (e.g. Invite (Prefix+B(CSRN))) via MGCF node 205. The MGCF node 205 translates the SIP Invite (Prefix+B (CSRN)) into the appropriate ISUP messaging and is configured to route the terminating call to GMSC node 206 CS network 107 (e.g. an Initial Address Message (IAM) including information representing the Prefix and B(CSRN)). At the GMSC node 206, the presence of the "prefix" causes GMSC node 206 to send the SRI query with the "Suppress T-CSI" parameter such that the CS network 107 connects the terminating call with UE-B 103 in an appropriate access network.

In the case of a dual terminating service engine, in which an operator has both IMS and CS networks serving their terminating subscribers (e.g. UE-B 103 or B-subscribers) at the same time. The service indication and policy rules mechanism performed at the SCC-AS node 201 may be used to appropriately modify the SIP messaging for routing the terminating call to indicate to the GMSC node 206 that the terminating call is associated with a dual terminating service engine subscriber and should be treated as a "normal" CS subscriber in this instance, that is the GMSC node 206 should invoke CS services as normal so that the terminating call is terminated in the CS network 107.

Although this example illustrates the T-SDS function being performed by the SCC-AS node 204 of IMS network 106, it is to be appreciated that any IMS node may perform the T-SDS function, which may be extended to provide the service indication and policy engine mechanism. Although this example illustrates the use of the service indicator for RCS subscribers, it is to be appreciated that a plurality of service indicators may be used to represent a plurality of call services that include IMS services and/or CS voice services. The service indicator(s) may represent call services related to messaging/video services in the IMS and/or in the CS networks.

Figure 3:
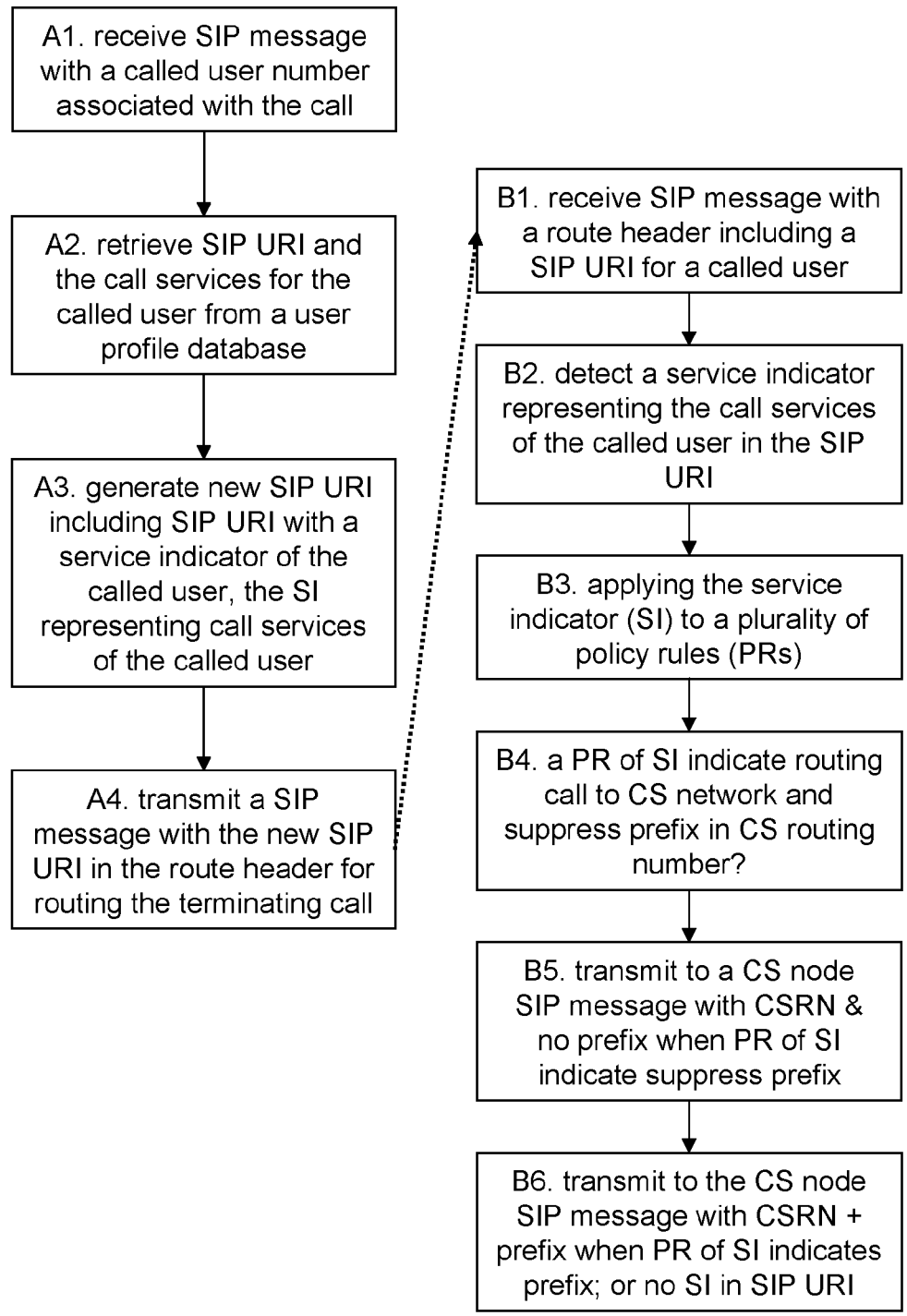
FIG. 3 is a flow diagram illustrating an example of a solution for routing a terminating call.

FIG. 3a is a flow diagram illustrating an example process of a solution performed at a first IMS node including the functionality of an S-SCSF and at a second IMS node including the functionality of a T-SDS function. The steps performed at the first IMS node include:

A1. Receiving a SIP message with a called user number associated with a terminating call. For example, the SIP message may be received from a second IMS node (e.g. an IMS node from in another IMS network, an I-CSCF or I-BCF or I-BGF node) and the called user number of the UE may include an MSISDN of the called user or user equipment.

A2. Retrieving a SIP URI and the call services for the called user from a user profile database. For example, retrieving the SIP URI after performing an LIR/LIA query or an iFC query in relation to the called user.

A3. Generate a new SIP URI including the retrieved SIP URI and a service indicator of the called user, the service indicator representing call services of the called user. The service indicator may form part of the fully-qualified domain name of the SIP URI. The service indicator may also include data representative of the call services of the called user.

A4. Transmitting a SIP request message with the new SIP URI in the route header for routing the terminating call. The SIP request message may be transmitted to an IMS node that includes a T-SDS function for use in routing the terminating call. The IMS node may include a policy engine for recognising the service indicator in the new SIP URI, and perform routing of the terminating call according to policy rules associated with the service indicator.

The steps performed at the second IMS node include:

B1. Receiving a SIP request message with a route header including a SIP URI associated with a called user.

B2. Detecting a service indicator representing the call services of the called user in the SIP URI. For example, the received SIP URI may be parsed to detect data representing the service indicator.

B3. Applying the service indicator to a plurality of policy rules stored or accessible to the second IMS node. A policy engine may be employed for recognising the service indicator in the SIP URI, and performs routing of the terminating call according to policy rules associated with the service indicator.

B4. Determining whether a policy rule (from the plurality of policy rules) is associated with the service indicator, and whether the policy rule for the service indicator indicates routing the terminating call to a CS network and whether suppression of a prefix in a CS routing number is required? If so, then proceed to step B5, otherwise proceed to B6. The step of determining may further include determining whether the service indicator is associated with a routing policy rule indicating that the terminating call should be routed to the CS network and that a CSI trigger associated with the terminating call is to be enabled at a CS node (e.g. a GMSC node).

B5. Transmit to a CS node (e.g. a GMSC node) of the CS network a SIP message with a CSRN associated with the called user and no prefix. For example, transmitting to the CS node a SIP message including a CSRN for the UE of the called user without the prefix when the routing policy rule associated with the service indicator indicates routing the terminating call to the CS network and enabling the CSI trigger.

B6. Transmit to the CS node of the CS network a SIP message with a CSRN associated with the called user and a prefix. This step may occur when there is no service indicator in the SIP URI, or when the policy rule indicates suppression of the prefix is not required, or when there is no policy rule for a service indicator. For example, transmitting, to the CS node, a SIP message including a CS routing number for the UE of the called user with a prefix when a routing policy rule associated with the service indicator indicates transmission of the prefix and suppression of the CSI trigger or when it is determined that the SIP URI does not include a service indicator. An example CSI trigger that may be used is the T-CSI trigger.

Figure 4:
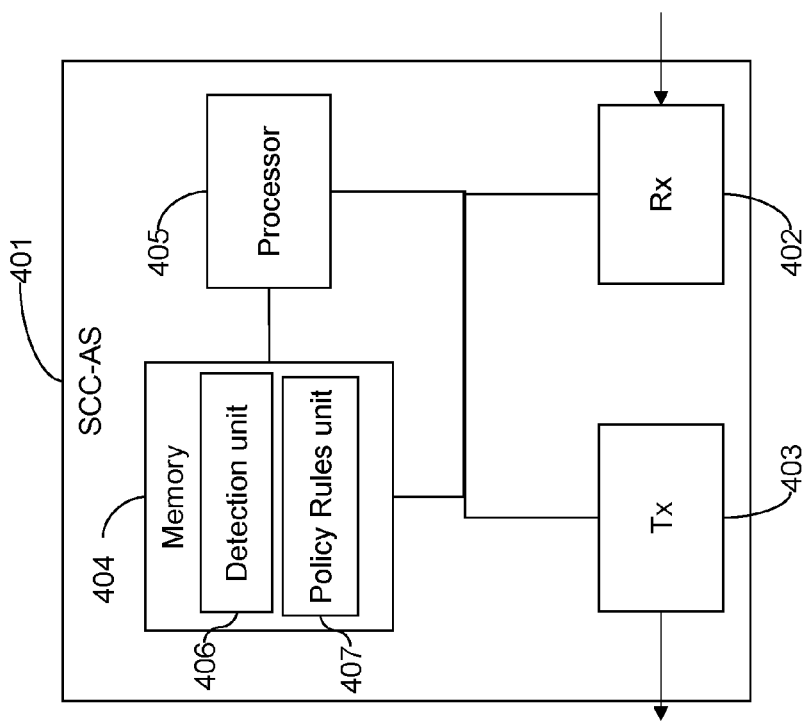
FIG. 4 illustrates schematically an example of a network node suitable for implementing the methods, examples, and solutions described herein.

FIG. 4 illustrates schematically an example of an IMS node 401, or a network node including T-SDS functionality (for example the SCC-AS node of FIGS. 2a and 2b), for use in implementing the methods, processes and/or the solutions described above. The IMS node 401 can be implemented as a combination of computer hardware and software, and can be configured to operate as an IMS node 401 in accordance with the solutions described above. The IMS node 401 comprises a receiver 402, a transmitter 403, a memory 404 and a processor 405, which are connected together. The memory 404 stores the various programs/executable files that are implemented by the processor 405 and also provides a storage unit for any required data e.g. data representative of various services and service indicators, policy rules for implementing a plurality of policies for performing T-SDS and/or T-ADS for a terminating call based on service indicators of the called user. The policy rules may include rules for routing a terminating call based on the call services of the called user. The programs/executable files stored in the memory 404, and implemented by processor 405, include one or more of, but are not limited to, a detection unit 406 and a policy rules unit 407. The detection unit 406 is for detecting whether a service indicator representing the call services of the called user is included in a SIP URI of a SIP request message. The policy rules unit 407 may be a policy engine for applying any service indicator detected to a plurality of policy rules, when the policy rules relate to routing terminating calls they can be used for indicating whether the terminating call should be routed to the CS network and whether insertion of a prefix to a CSRN of the called user should be suppressed.

In operation, the receiver unit 402 is configured for receiving a SIP message from a second IMS node (e.g. an S-CSCF node). When the SIP message includes, in a route header of the SIP message, a SIP URI associated with the called user, then the processor 405 is configured (by detection unit 406) to detect whether a service indicator representing the call services of the called user is included in the SIP URI. The processor 405 is then configured (by policy rules unit 407) to apply the service indicator to a plurality of policy rules for indicating whether the terminating call should be routed to the CS network and whether to suppress insertion of a prefix to a CS routing number of the called user. The transmitter 403 is configured for sending to a CS node (e.g. a GMSC node) a SIP message including the CS routing number without the prefix when a routing policy rule associated with the service indicator indicates suppression of the prefix.

In addition, the transmitter 403 may be further configured to send to the CS node a SIP message including the CS routing number and the prefix when the processor 405 (by policy rules unit 407) determines that a routing policy rule associated with the service indicator indicates transmission of the prefix or when it is determined that the SIP URI does not include a service indicator.

The processor 405 may be further configured (via policy rules unit) for determining whether the service indicator is associated with a routing policy rule indicating that the call should be routed to the CS network and that a CSI trigger associated with the terminating call is to be enabled at the CS node. If this is the case, then the transmitter 403 is further configured for sending a SIP message to the CS node, in which the SIP message includes a CS routing number (with no prefix) for the called user when the processor 405 determines that a routing policy rule associated with the service indicator indicates routing the call to the CS network and enabling the CSI trigger. The transmitter 403 may be further configured for sending a SIP message to the CS node, the SIP message including a CS routing number with a prefix for the called user when the service indicator is not included in the SIP URI and when routing the call to the CS network with suppression of the CSI trigger is required. The CSI trigger can be a T-CSI trigger or other CAMEL parameter that is enabled or suppressed to ensure the terminating call is routed appropriately to the CS network 107 and not looped back to the IMS network 106.

Figure 5:
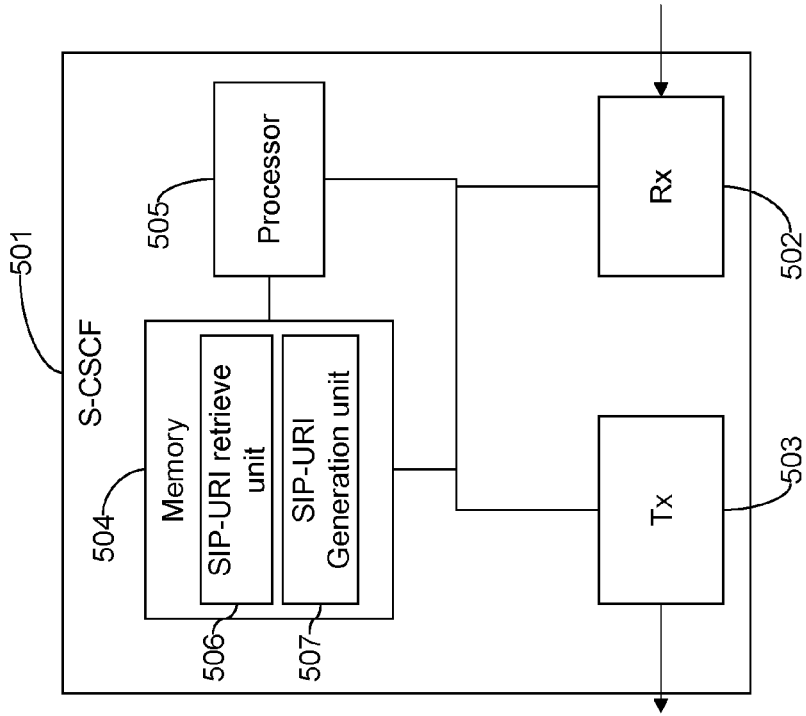
FIG. 5 illustrates schematically an example of another network node suitable for implementing the methods, examples, and solutions described herein.

FIG. 5 illustrates schematically an example of a IMS node 501, or a network node including the functionality of an S-CSCF node, for use in implementing the methods, processes and/or the solutions described above. The IMS node 501 is used in routing a terminating call associated with a UE of a called user in a network comprising a CS network and an IMS network. The network node 501 can be implemented as a combination of computer hardware and software, and can be configured to operate as an S-CSCF node in accordance with the solutions described above. The IMS node 501 comprises a receiver 502, a transmitter 503, a memory 504 and a processor 505, which are connected together. The memory 504 stores the various programs/executable files that are implemented by the processor 505 and also provides a storage unit for any required data e.g. data representative of various services and service indicators based on the call services of called users. A service indicator comprises data representative of one or more call services of a called user, such as IMS services or CS services, or a combination of IMS and CS call services. As an example, the service indicators may represent call services based on IMS services such as email, video messaging, video streaming and/or CS voice services. The programs/executable files stored in the memory 504, and implemented by processor 505, include one or more of, but are not limited to, a SIP-URI retrieve unit 506 and a SIP-URI generation unit 507. The SIP-URI retrieve unit 506 is for retrieving the call services and SIP-URI for a called user. The SIP-URI generation unit 507 is for defining how the SIP-URI is generated for including the service indicator indicating the call services of the called user.

In operation, the receiver 502 is configured for receiving a SIP request message from a second IMS node (e.g. an I-CSCF node) in the IMS network or another IMS network. When the SIP message includes a called user number (e.g. an MSISDN) associated with the terminating call the processor 505 is configured (by the SIP-URI retrieve unit 506) to retrieve a SIP-URI and the call services for the called user from a user profile database (e.g. an iFC is performed). The processor 505 is further configured (by the SIP-URI generate unit 507) to generate an second SIP URI by inserting a service indicator of the called user into the SIP URI, the service indicator representing the call services of the called user. The transmitter 503 is configured to transmit a SIP request message including the called user number and the second SIP URI in a route header of the SIP message to a third IMS node (e.g. an IMS node with T-SDS functionality) for use in routing the terminating call. The service indicator may form part of the fully-qualified domain name of the SIP-URI.

It will be appreciated by the person of skill in the art that various modifications may be made to the above-described embodiments without departing from the scope of the present invention. For example, whilst the above-described embodiments refer to specific entities, nodes or functions within an IMS network, such as the SCC-AS node(s), S-CSCF node(s), I-CSCF node(s), T-SDS and T-ADS functions it is possible that the names used to refer to one of more of these entities, nodes or functions, could change, or that the functionality of one or more of these entities, nodes, or functions may be combined with that of another network entity of IMS node. In addition, whilst the above-described embodiments refer to some specific call services/subscriptions of the called user, such as call services based on a rich communication suite, RCS/RCS-e and the called user being an IMS subscriber, it is to be appreciated that other call services that include IMS services/subscriptions and/or CS voice services/subscriptions or CS services/subscriptions, e.g. call services related to messaging/video services in the IMS and/or in the CS networks, are applicable and may be represented by a corresponding service indicator or a plurality of service indicators and associated policy rules.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, or nodes disclosed or illustrated in the present specification may be incorporated into the invention, whether alone or in any appropriate combination with any other feature, step, or node disclosed or illustrated herein.

The invention claimed is:

1. A method of routing a terminating call associated with a user equipment, UE, of a called user in a network comprising a circuit switched, CS, network and an IP Multimedia Subsystem, IMS, network, the method, performed by a first IMS node, comprising the steps of:
   receiving a Session Initiation Protocol, SIP, message from a second IMS node, the received SIP message including, in a route header of the received SIP message, a SIP Uniform Resource Identifier, URI, associated with the called user;
   detecting whether a service indicator representing the call services of the called user is included in the SIP URI;
   applying the service indicator to a plurality of policy rules for indicating whether the terminating call associated with the UE should be routed to the CS network and whether to suppress insertion of a prefix to a CS routing number for the UE of the called user; and
   transmitting a SIP message to a CS node and, when a routing policy rule associated with the service indicator indicates suppression of the prefix, including in the transmitted SIP message the CS routing number without the prefix.

2. The method according to claim 1, wherein, when the routing policy rule associated with the service indicator indicates transmission of the prefix or when it is determined that the SIP URI does not include a service indicator, including in the transmitted SIP message the CS routing number and the prefix.

3. The method according to claim 1, wherein:
   the step of applying the service indicator to the plurality of policy rules includes the step of:
      determining whether the service indicator is associated with a routing policy rule indicating that the terminating call should be routed to the CS network and that a Customized Applications for Mobile Network Enhanced Logic Subscription Information, CSI, trigger associated with the terminating call is to be enabled at the CS node; and
   the step of transmitting the SIP message to the CS node includes the steps of:
      transmitting to the CS node the SIP message including the CS routing number for the UE of the called user without the prefix when the routing policy rule associated with the service indicator indicates routing the terminating call to the CS network and enabling the CSI trigger; and
      transmitting, to the CS node, the SIP message including the CS routing number for the UE of the called user with the prefix when the routing policy rule associated with the service indicator indicates transmission of the prefix and suppression of the CSI trigger or when it is determined that the SIP URI does not include a service indicator.

4. The method according to claim 3, wherein the CSI trigger is a terminating CSI trigger.

5. The method according to claim 1, further comprising the steps of:

determining whether the service indicator is associated with a routing policy rule indicating whether the terminating call should be routed within the IMS network; and transmitting a SIP message to a further IMS node for terminating the call in the IMS network.

6. The method according to claim 1, wherein the first IMS node includes a terminating service domain selection, T-SDS, function, and performs the steps of detecting, applying, and transmitting when routing the terminating call.

7. The method according to claim 1, wherein the second IMS node includes serving call/session control functions.

8. A method of routing a terminating call associated with a user equipment, UE, of a called user in a network comprising a circuit switched, CS, network and an IP Multimedia Subsystem, IMS, network, the method, performed by a first IMS node, comprising the steps of:

receiving a Service Initiation Protocol, SIP, message from a second IMS node, the received SIP message including a called user number of the UE associated with the terminating call;

retrieving a SIP Uniform Resource Identifier, URI, and the call services for the called user from a user profile database;

generating a second SIP URI by including a service indicator of the called user in the SIP URI, the service indicator representing the call services of the called user; and transmitting, to a third IMS node, SIP message including the second SIP URI in a route header of the transmitted SIP message for use in routing the terminating call.

9. The method according to claim 8, wherein the step of retrieving the SIP URI for the called user further includes performing an initial filter criteria query in relation to the called user.

10. The method according to claim 8, wherein the third IMS node includes a terminating service domain selection, T-SDS, function for use in routing the terminating call.

11. The method according to claim 8, wherein the called user number of the UE is a Mobile Subscriber Integrated Services Digital Network Number, MSISDN, for the UE of the called user and the step of transmitting the SIP message to the third IMS node includes sending the MSISDN in the transmitted SIP message for use in routing the terminating call.

12. The method according to claim 8, wherein the second IMS node includes interrogating call/session control functions.

13. A network node for routing a terminating call associated with a user equipment of a called user in a network comprising a circuit switched, CS, network and an IP Multimedia Subsystem, IMS, network, the network node comprising:

a receiver, a transmitter, a memory unit, and a processor, the processor being connected to the receiver, to the transmitter, and to the memory unit wherein:

the receiver is configured for receiving a Session Initiation Protocol, SIP, message from a first IMS node, the received SIP message including, in a route header of the received SIP message, a SIP Uniform Resource Identifier, URI, associated with the called user;

the processor is configured to:

detect whether a service indicator representing the call services of the called user is included in the SIP URI;

apply the service indicator to a plurality of policy rules for indicating whether the terminating call should be routed to the CS network and whether to suppress insertion of a prefix to a CS routing number for the UE of the called user; and the transmitter is configured for transmitting a SIP message to a CS node, said transmitted SIP message including the CS routing number without the prefix when the processor determines that a routing policy rule associated with the service indicator indicates suppression of the prefix.

14. The network node according to claim 13, wherein, when the processor determines that the routing policy rule associated with the service indicator indicates transmission of the prefix or when the processor determines that the SIP URI does not include a service indicator, the transmitted SIP message includes the CS routing number and the prefix.

15. The network node according to claim 13, wherein the processor is further configured for determining whether the service indicator is associated with a routing policy rule indicating that the terminating call should be routed to the CS network and that a Customized Applications for Mobile Network Enhanced Logic Subscription Information, CSI, trigger associated with the terminating call is to be enabled at the CS node;

wherein, when the processor determines that the routing policy rule associated with the service indicator indicates routing the terminating call to the CS network and enabling the CSI trigger, the transmitted SIP message includes a CS routing number for the UE of the called user; and wherein, when the processor determines that the routing policy rule associated with the service indicator indicates routing the terminating call to the CS network and suppressing the CSI trigger or when the service indicator is not included in the SIP URI, the transmitted SIP message includes the CS routing number for the UE of the called user with the prefix.

16. A network node for use in routing a terminating call associated with a user equipment of a called user in a network comprising a circuit switched, CS, network and an IP Multimedia Subsystem, IMS, network, the network node comprising:

a receiver, a transmitter, a memory unit, and processor, the processor being connected to the receiver, to the transmitter, and to the memory unit wherein:

the receiver is configured for receiving a Service Initiation Protocol, SIP, message from a first IMS node, the received SIP message including a called user number associated with the terminating call;

the processor is configured to:

retrieve a SIP Uniform Resource Identifier, URI, and the call services for the called user from a user profile database;

generate a second SIP URI by inserting a service indicator of the called user into the SIP URI, the service indicator representing the call services of the called user; and the transmitter is configured to transmit, to a third IMS node, a SIP message further including the second SIP URI in a route header of the transmitted SIP message for use in routing the terminating call.

* * * * *